Patented Nov. 4, 1952

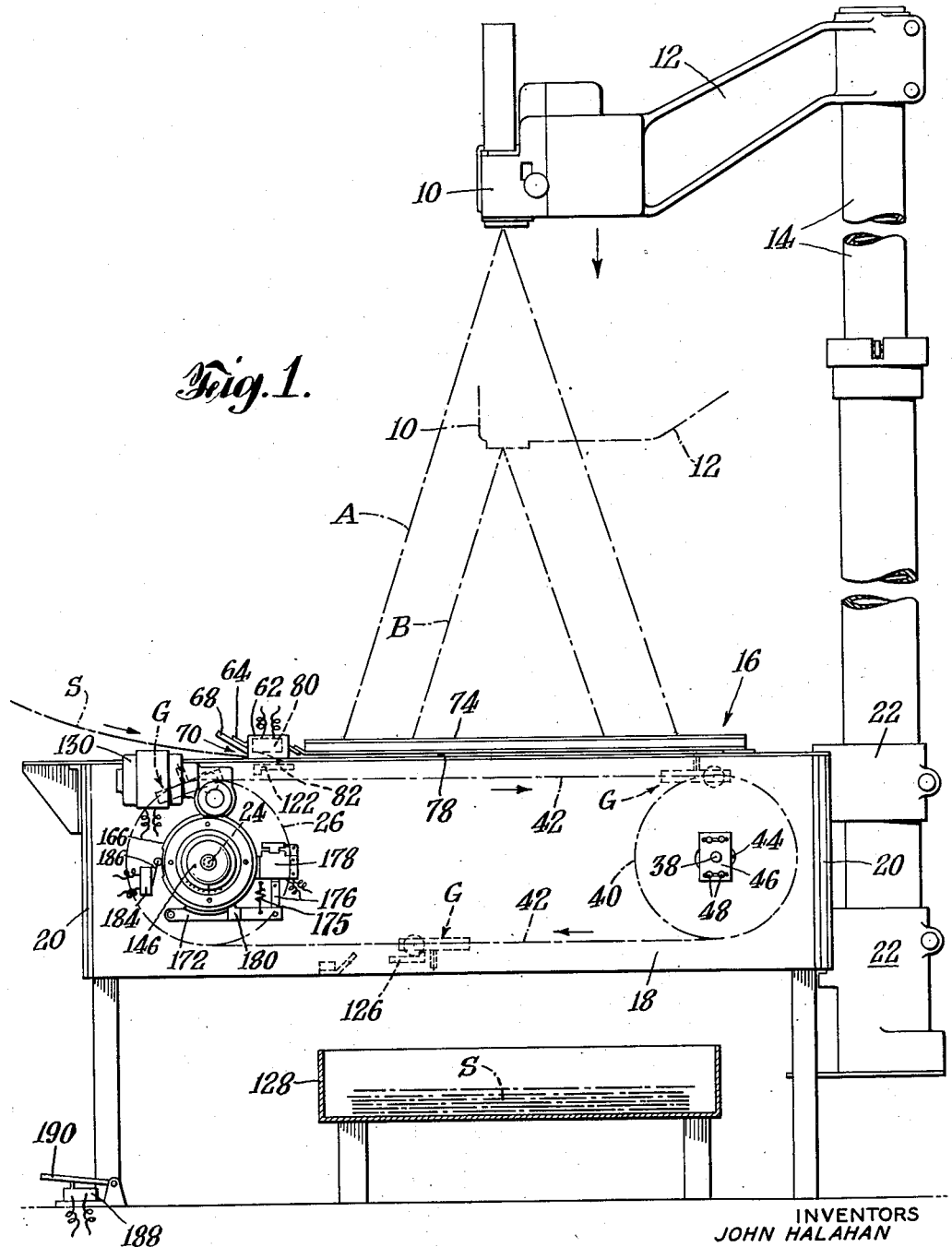

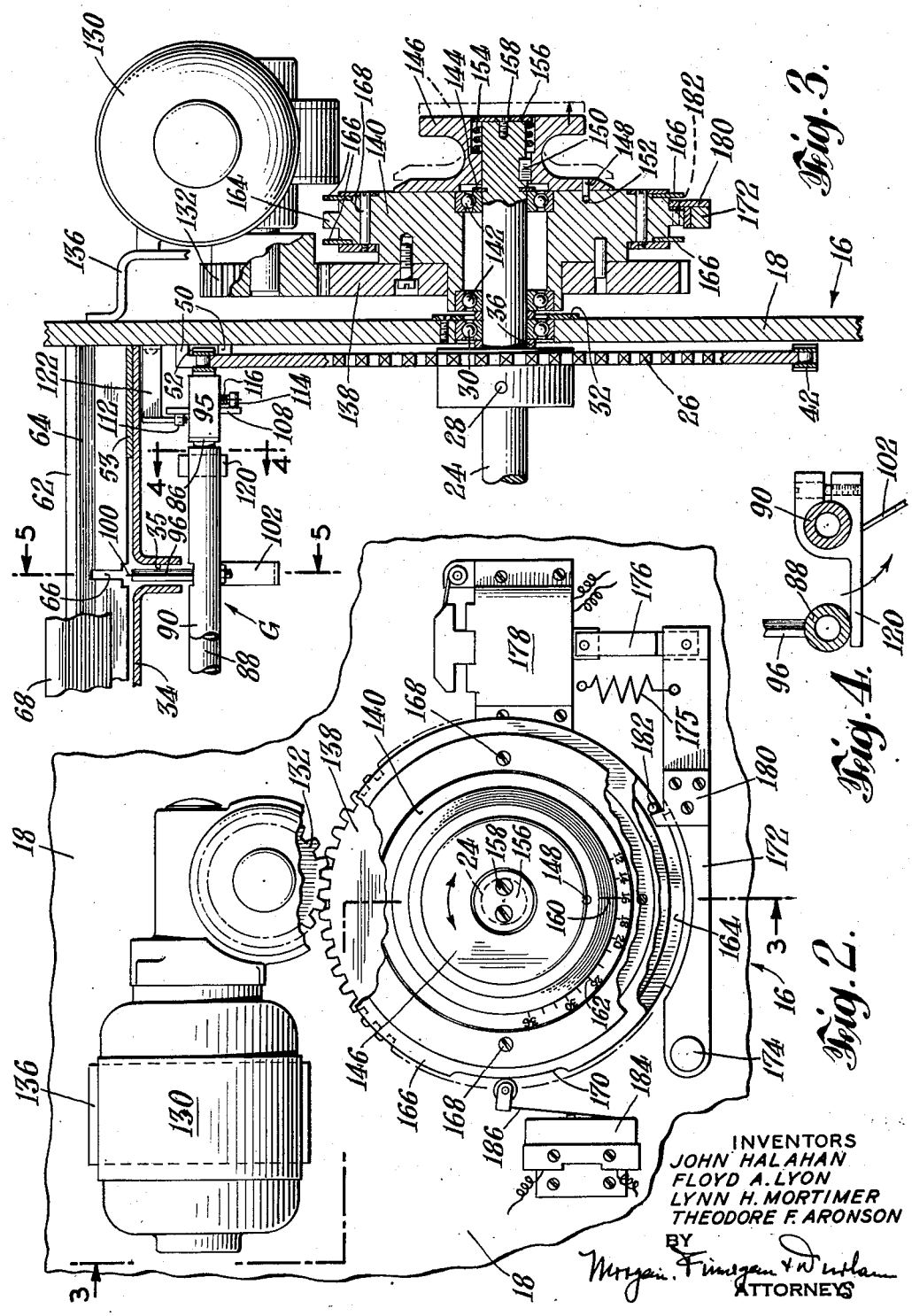

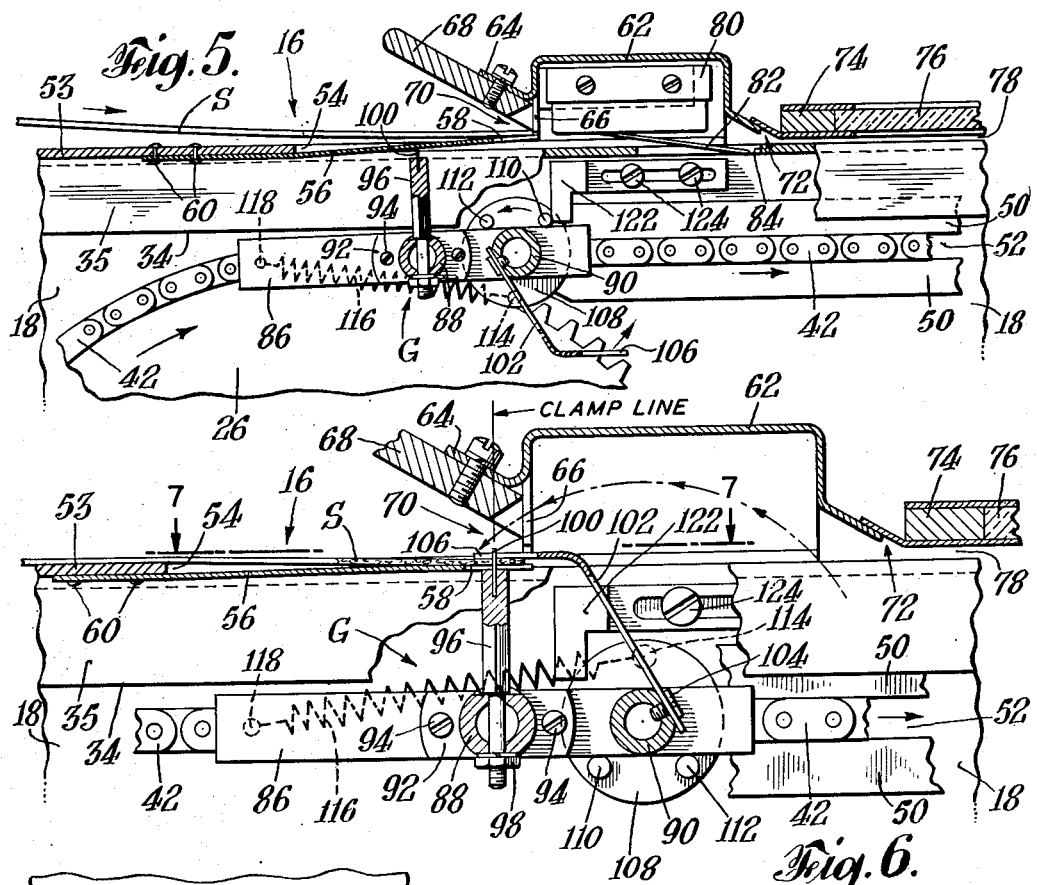
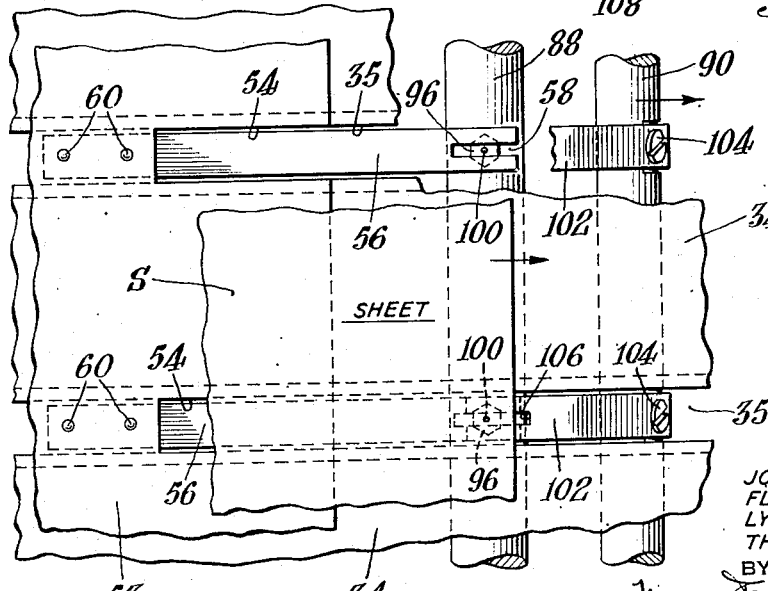

2,616,691

UNITED STATES PATENT OFFICE 2,616,691

SHEET FEEDING MEANS FOR COPYING CAMERAS

John Halahan, Jackson Heights, and Floyd A. Lyon, Hillside Heights, N. Y., and Lynn H. Mortimer, Caldwell, N. J., and Theodore F. Aronson, St. Albans, N. Y., assignors, by mesne assignments, to Microfilming Corporation of America, Maywood, N. J., a corporation of New Jersey Application January 10, 1948, Serial No. 1,588

10 Claims. (Cl. 271—45)

This invention relates to feed mechanisms and more particularly to feed mechanisms of the character adapted for feeding sheet material.

More specifically, the invention relates to a feed mechanism for successively gripping and feeding individual sheets to different positions along the path of feed, each position corresponding to a different sheet size.

The invention has particular reference to a feed mechanism for successively gripping individual sheets of different sizes at a fixed starting position and conveying the sheets to a position centrally of a fixed surface disposed in the path of feed whereupon cessation of feed occurs automatically in response to an adjustable control means which operates to vary the extent of feed in accordance with the sheet size to which the control means has been set.

An object of the invention is to provide an improved sheet gripping and feeding mechanism for use in conjunction with micro-film copying cameras whereby sheets of different sizes may be conveyed in rapid succession from a fixed starting position to a position centrally of a fixed exposure frame in the path of feed.

Another object of the invention is to provide an improved sheet gripping and feeding mechanism for use in conjunction with micro-film copying cameras which is adapted for successively gripping and feeding individual sheets of different sizes to different positions on a fixed exposure frame in the path of feed whereby to position each sheet centrally of the exposure frame.

A further object of the invention is to provide an improved sheet gripping and feeding mechanism for use in conjunction with micro-film copying cameras which is adapted to be indexed in accordance with the size of the sheets to be copied whereby the mechanism is operable to successively position each sheet centrally of a fixed exposure frame in the path of feed.

Another object of the invention is to provide an improved sheet gripping and feeding mechanism for use in conjunction with micro-film copying cameras which is adapted for successively feeding individual sheets of different sizes in a flat condition to a position centrally of a fixed exposure frame in the path of feed, and for holding each sheet substantially in the plane of the exposure frame during an exposure period, the mechanism being operable upon a successive sheet feeding operation to advance a sheet from the exposure position to a position over a sheet receiving receptacle and for automatically discharging the same thereinto.

With the above and other objects in view, the invention resides in the novel construction, combination, and arrangement of parts, the novel features of which are set forth with particularity in the appended claims, the invention itself, however, both as to its organization and its method of operation, together with additional objects and advantages thereof, being best understood from the following description of a specific embodiment thereof when taken in connection with the accompanying drawings, in which Figure 1 is a side elevational view partly in section illustrating the feed mechanism in conjunction with a micro-film copying camera and in position preparatory to the initiation of a sheet gripping and feeding operation;

Figure 2 is an enlarged fragmentary detail view in elevation of the drive means, control means, and indexing means in Figure 1;

Figure 3 is a detailed sectional view taken on the line 3—3 of Figure 2;

Figure 4 is a fragmentary detail sectional view taken on the line 4—4 of Figure 3;

Figure 5 is an enlarged fragmentary elevational view partly in section illustrating the gripping means about to be moved into sheet gripping position;

Figure 6 is a similar view illustrating the gripping means after it has engaged a sheet of material at the start of feed; and Figure 7 is a fragmentary top plan view of a portion of Figure 6.

Referring to the drawings and to Figure 1 in particular, a sheet gripping and feeding mechanism, constructed in accordance with the present invention, is shown as associated with an overhead copying camera of the micro-film type for reproducing drawings, newspapers, documents and similar sheet material usually at minifications of from ten or fifteen to twenty-five times.

The camera may be of any desired type adapted to take successive exposures by remote control, such cameras usually including an electric motor driven mechanism for actuating the shutter and advancing a length of 16 or 35 mm. film.

As shown, the camera 10 is supported by a bracket arm 12 projecting laterally from a telescoping standard 14 which extends vertically upwardly from a suitable table 16, provided with side and end panels 18 and 20 respectively, with the lowermost end portion of the standard 14 suitably secured in a pair of split clamping brackets 22 suitably attached to one end panel 20 of the table 16. Thus, the camera 10 is adjustable relative to the table 16 by virtue of the vertical adjustment afforded by the telescoping standard 14, the broken lines A indicating the exposure field of the camera at a large minification and the broken lines B at a small minification.

In accordance with the present invention the feed mechanism comprises a drive shaft 24, having a sprocket wheel 26 secured thereon adjacent each of its opposite ends by means of a pin 28 or equivalent, which is journalled in suitable anti-friction bearings 30 recessed in and retained in the side panels 18 of the table 16 by suitable retention washers 32. The sprocket wheels 26 are disposed below the top panel 34 of the table 16 and adjacent the inner face of the side panels 18 with a spacing washer 36 therebetween and with one end of the shaft 24 extending outwardly beyond one of the panels 18 as clearly shown in Figure 3.

An idler shaft 38 also provided with a pair of similar sprocket wheels 40 in identical manner, is also journalled between the side panels 18 in spaced horizontal alignment with the drive shaft 24 and a reach of suitable link chain 42 or equivalent, disposed on and between each of the sprocket wheels 26 and 40 whereby the idler shaft 38 is connected to the drive shaft 24.

As shown in Figure 1, the idler shaft 38 extends through suitable clearance apertures 44, provided therefor in the panels 18, into suitable bearing plates 46 adjustably secured on the outer side of the panels 18, as at 48, whereby the idler shaft 38 is laterally adjustable with the bearing plates 46 relative to the drive shaft 24 for taking up slack in the chains 42 after they have been placed on the sprocket wheels.

As shown in Figures 3, 5 and 6, a plurality of rectangular rails 50 are suitably secured, in spaced parallel pairs, to the inner face of each of the side panels 18, intermediate their respective opposite ends, whereby to provide lateral extensions thereon forming oppositely disposed U-shape channels 52 substantially receiving the upper and lower horizontal reaches of the chains 42 therein whereby the chains are maintained in a linear path and sagging thereof thus prevented.

Further in accordance with the invention and as best shown in Figure 7, the top panel 34 of the table 16 is provided with a plurality of parallel open slots 35, extending longitudinally thereof short of its opposite ends, with a rectangular plate 53, provided with a like number of open ended parallel slots 54, secured to the top panel of the table transversely of one end thereof with its slots 54 in aligned registration with the table slots 35, a plurality of suitable leaf springs 56, each having an open ended slot 58 in one end thereof, being secured to the underside of the plate 52, as at 60, in aligned registration with the slots 35 and 54 with their extended slotted end portions biased substantially upwardly through the table slots 35, as in Figure 5.

As shown in Figures 5 and 6, a U-shape channel bar 62 having a row of tabs or ears 64 struck out of the plane of one side wall thereof and forming a row of clearance slots 66 therein, is suitably secured transversely of the table 16, in inverted spaced relation to its top panel 34, with the slotted side wall extending across the free ends of the leaf springs 56 and the slots 66 in aligned registration therewith. As shown, the ears 64 are inclined upwardly, relative to the table 16, with an extension plate 68 suitably secured thereto whereby to form a throat 70 for receiving and guiding the leading marginal edge of a sheet S into abutment with the slotted side wall.

The opposite side wall of the channel bar 62 has its marginal portion inclined outwardly and downwardly toward the top of the table 16 to form a second guide throat 72 therebetween, and for the suitable attachment thereto of one end of an exposure frame 74, including a glass plate 76, in spaced relation to the table, the opposite end of the frame 74 being similarly secured to the table whereby to position the glass plate 76 in spaced parallelism with the top surface of the table to form a slot 78 therebetween for the passage of the sheet S therethrough while maintaining the sheet in the plane of the table.

A suitable switch block 80, including a contact arm 82, adapted to be connected in an operating circuit (not shown) for controlling a function of the camera 10, is suitably secured to the underside of the channel bar 62 with its contact arm 82 extended into a suitable aperture 84, provided therefor in the top panel 34 of the table between two of the slots 35, whereby the contact arm 82 is adapted to be displaced by the feeding of the sheet S through the aforesaid slot 78.

Further in accordance with the invention, a plurality of sets of sheet gripping elements G are attached to and between the chains 42 in equally spaced relation. Since the respective sets of gripping elements are identical only one set will be described. Accordingly, each set of gripping elements comprises a narrow rectangular plate 86 secured to the inner side of each chain 42 by suitable screws (not shown) which are substituted for two of the usual link pins therein whereby the plates 86 are maintained in horizontal position along the horizontal reaches of the chains, and a pair of tubular shafts 88 and 90 respectively, the shaft 88 being secured to and between the plates 86 by means of a pair of suitable brackets 92, each secured in one end of the shaft 88 and to one of the plates 86 by means of the screws 94.

The shaft 90 is journalled on and between the plates 86, in spaced alignment with the shaft 88, by means of a pair of suitable bearing blocks or brackets 95 (Figure 3) each of which are similarly secured to one of the plates 86 with the ends of the shaft 90 suitably pivoted therein whereby the shaft 90 is adapted to be rotated relative to the chains 42 and its correlated shaft 88.

A shown in Figures 5, 6 and 7, the shaft 88 is provided with a row of suitable studs 96 each having a reduced end portion extending through the shaft 88 normal thereto and secured thereon by means of a nut 98 threaded on each reduced end projecting beyond the shaft 88, each stud 96 being positioned in the path of one of the table slots 35 for passage therethrough in response to movement of the chains 42 as shown in Figure 3. The upper free end of each stud 96 is provided with an upstanding pointed pin 100 suitably recessed axially thereof, whereby to present a row of pin points extending a uniform distance beyond the free ends of the studs 96 and through the slots 58 in the leaf springs 56 when positioned as shown in Figure 6.

The shaft 90 is also provided with a like number of substantially L-shaped spring plate fingers 102 which are secured, adjacent the end of their longest leg, to the shaft 90 by means of screws as indicated at 104, the opposite free end of each fingers 102 to the position shown in Figure 6. slot 106 adapted to receive one of the pointed pins 100 therethrough upon movement of the fingers 102 to the position shown in Figure 6.

A disc 108 provided with two angularly spaced pins 110 and 112 projecting from one side thereof, and a pin 114 projecting from its opposite side, is suitably secured adjacent one end of the shaft 90 with a retractile spring 116 anchored to the pin 114 and to the plate 86, as indicated at 118.

Thus, the shaft 90 including the fingers 102 is adapted to be partially rotated either in a clockwise or counter-clockwise direction, after initial rotation thereof by means presently to be described, whereby to position the fingers 102 either in an inactive position as in Figure 5, or in active position as in Figure 6, clockwise rotation of the shaft 90 being limited by a stop arm 120 also secured thereto and adapted to engage the shaft 88 as in Figure 4.

Means for initially rotating the shaft 90 upon movement of the chains 42 in the direction of the arrow in Figure 5 comprises an angular cam plate 122 which is adjustably secured to one side panel 18, as at 124, with one leg thereof extending into the path traversed by the disc 108. Thus, as each set of the gripping elements G successively approach the cam plate 122, the pin 110 on the disc 108 will strike the extended leg of the cam plate 122 and rotate the shaft 90 in a counter-clockwise direction until the spring anchoring pin 114 passes dead center whereupon the spring 116 takes over rotation thereof to snap the fingers 102 carried thereby, down on the studs 96 carried by the shaft 88 to impale the sheet of material S on the pins 100 thereof, as clearly shown in Figure 6.

Instead of impaling the sheets S on a plurality of pins as aforesaid, the pins 100 may be dispensed with and the free end of each stud 96 provided with a suitably shaped tip, pad or cap of yieldable non-metallic material such as rubber, for example, whereby the studs 96 will be adapted to exercise frictional engagement with the sheet of material S, when the fingers 102 are clamped down thereon, as in Figure 6.

A cam plate 126 is also secured to the table 16 along the corresponding lower chain reach whereby to restore the fingers 102 from active position, as in Figure 6, to inactive position, as in Figure 5. Thus, as the disc 108 approaches the lower cam plate 126, the opposite pin 112 on the disc 108 will strike the extended free end of the cam plate 126 and similarly rotate the shaft 90 in an opposite or clockwise direction until the spring anchoring pin 114 passes dead center whereupon the spring 116 will rotate the shaft 90 until the stop arm 120 thereon strikes the shaft 88.

With the fingers 102 on the shaft 90 thus restored to inactive position along the lower reaches of the chains 42, the sheet S, for example, is free to drop by gravity from the pins 100 into a suitable receptacle 128 positioned under the table 16 as shown in Figure 1 or, if desirable, any known means may be secured to the table 16 in the path of and slightly below the lower reaches of the chains 42 for positively stripping the sheet S from the pins 100 after the fingers 102 have been restored to inactive position as described.

Referring now to Figures 2 and 3, means for driving and controlling the shaft 24 comprises an electric motor 130, including a worm gear reduction drive terminating in a pinion 132, which is suitably secured outwardly of one side panel 18 of the table 16 by means of a suitable bracket 136 with the pinion 132 in mesh with a spur gear 138 suitably secured on and to the inner face of an annular drum 140 journalled on the extended end portion of the shaft 24 by means of a pair of anti-friction bearings 142 and retained thereon against relative axial displacement by means of a split ring 144 seated in an annular groove in the shaft 24 adjacent the outer bearing 142.

The shaft 24 is coupled to the drum 140 in driving relation by means of a suitable dial type knob 146 having a pin 148 projecting from one end face thereof, and slidably mounted on the shaft 24 for rotation therewith by means of a key and keyway construction indicated at 150, the pin 148 normally extending into one of a plurality of angularly spaced apertures 152 provided therefor in the adjacent side face of the drum.

The opposite end of the knob 146 is provided with a counterbore for the reception of a suitable spring 154 and a retention disc 156, secured to the end face of the shaft 24 by the screws 158 whereby the knob is adapted to be moved along the shaft to the broken line position, shown in Figure 3, to withdraw its pin 148 from one of the apertures 152 to permit manual rotation of the knob 140 for changing the angular position of the shaft 24 relative to the drum 140.

As shown in Figure 2, the beveled edge of the knob 146 is provided with a reference line or graduation as at 160, and the adjacent face portion of the drum 140 with a plurality of graduations 162, one for each of the apertures 152 therein, the graduations 162 being numbered to indicate the different sheet sizes to which the knob 146 may be adjusted or indexed preparatory to a sheet feeding operation.

As shown in Figure 3, the drum 140 is further provided with an annular upstanding flange 164 on the periphery thereof, intermediate its side faces, to provide a breaking surface thereon, and a pair of cam rings 166 each suitably secured to one face of the drum, as at 168, concentric therewith and in spaced relation to the flange 164, each ring 166 having a suitable dwell 170 formed in its periphery as shown in Figure 2.

A brake arm 172 adapted to be moved into and out of frictional engagement with the flange 164 on the drum 140, is suitably pivoted, at one end thereof, to the adjacent side panel 18 by means of a suitable pivot pin 174, and the opposite end of the brake arm 172 is biased upwardly by spring 175 and is pivotally connected by means of a suitable link 176, to a solenoid 178 also secured to the side panel 18 as clearly shown in Figure 2.

Means for positively arresting rotation of the drum 140 whereby to accurately locate the dwells 170 in the same angular position upon the completion of each successive revolution of the drum, comprises a detent plate 180 suitably secured to the brake arm 172 and adapted to engage a pin 182, projecting from the outer side of the flange 164, upon movement of the arm 172 to braking position in response to the de-energization of the solenoid 178.

Means adapted for de-energizing the motor 130 and for de-energizing the solenoid 178 comprises a pair of micro-switches 184 each including a roller contact arm 186 which are suitably secured to the side panel 18 adjacent the drum 140 in side by side relation with each contact arm 186 in engagement with the peripheral surface of one of the cam rings 166.

A conventional spring biased double throw switch 188, adapted to be actuated by means of a foot pedal 190, is suitably secured to one leg of the table 16, as shown in Figure 1, and connected in circuit with the micro-switches 184 and the solenoid 178 to a power supply line in known manner. Thus, after the brake arm and stop pin have been disengaged by energization of solenoid and after the motor 130 has been initially energized by operation of the foot switch 188 and the drum 140 rotated through one revolution, the dwells 170 in the cam rings 166 will be in engagement with the contact arms 186 of the micro-switches 184 whereby the motor 130 will have been de-energized and the brake actuating solenoid 178 de-energized simultaneously automatically.

*Operation*

With the sheet feeding mechanism including the drum 140 at rest as in Figure 2, and preparatory to copying one or more sheets or documents of a given size, for example, the knob 146 is indexed to place the pin 150, carried thereby, into one of the apertures 152 in the drum 140 which corresponds to the size or length of the sheets to be copied.

For example, if each sheet to be copied is twenty inches long, the reference line 160 on the knob 146 is brought into registration with that graduation of the graduations 162 on the drum 140, which is numbered "twenty," whereby the angular position of the gripping elements is adjusted relative to the drum 140 in accordance with that size sheet.

Thereafter, one of the sheets as aforesaid is positioned on the table 16 with its leading marginal edge portion in engagement with the slotted end portion of the leaf springs 56 and its edge in abutment with the adjacent slotted side wall of the channel bar 62 square therewith as clearly shown in Figures 1 and 5.

With a sheet so positioned, the foot pedal 190 is subsequently depressed momentarily to operate the switch 188 whereupon the motor 130 is energized and movement of the sheet gripping elements G, carried by the chains 42, initiated.

As one of the sets of gripping elements G moves along under the free end portion of the leaf springs 56, as in Figure 5, the shaft 90 is turned in a counter-clockwise direction, with the assistance of the spring 116, by the engagement of the pin 110 with the cam plate 122 whereby the slotted ends of the fingers 102 are snapped down on the forward edge portion of the sheet to impale the same on the pins 100, carried by the shaft 88, which were moved to a position directly under the slotted ends of the leaf springs 56 by the chains 42, and during rotative movement of the fingers 102 to active or clamping position as in Figure 6.

With the sheet so impaled, movement of the chains 42 continues until the drum 140 has completed one revolution with the dwells 170 in position, as in Figure 2, to receive the arms 186 of the micro-switches 184 whereby the switches 184 are automatically operated to simultaneously de-energize the motor 130, and de-energize the solenoid 178 whereupon spring 175 lifts the brake arm 172 to apply the brake and positions the detent 180 in the path of the pin 182 carried by the drum 140. Thus, the chains 42 are brought to rest with the sheet positioned centrally of the exposure frame 74 and the camera exposure field.

After exposure of the first sheet to the camera 10, another sheet is similarly positioned on the table so as to be gripped at the same point and in the same manner by the next succeeding set of gripping elements G whereupon the foot switch 188 is again manually actuated to move the chains 42 through another portion of one complete revolution thereof. Thus, the first sheet is advanced to an inverted position over the receptacle 128 simultaneously with the positioning of the other or second sheet centrally of the exposure frame 74 whereupon the mechanism is again brought to rest automatically.

In the feeding of the next or third sheet to a position centrally of the exposure frame 74, in identical manner, movement of the chains 42 is again initiated whereby the first sheet is released into the receptacle 128 and the set of gripping elements which carried the first sheet, returned to starting position, as in Figure 1, whereby one revolution of the chains 42 is completed in three intermittent revolutions of the drum 140 including the shaft 24, additional sheets being similarly fed in rapid succession to a position centrally of the exposure frame 74.

From the foregoing, it will be readily apparent to those skilled in the art that when the knob 146 is adjusted to index the mechanism for a particular sheet size, that is, in a limited range of different sizes, such adjustment only changes the angular relationship of the three sets, for example, of gripping elements G relative to the two cam rings 166 which actuate the two micro-switches 184.

In other words, the set of gripping elements carried by the chains 42 are either advanced or retarded as a unit, in response to adjustment of the knob 146, relative to the dwells 170 in the cam rings 166 to a degree which is dependent upon the size of the sheet to be positioned with its center, in the center of the exposure frame 74 and to which size the knob 146 must be indexed.

It is this relative angular adjustment which causes the mechanism to operate to successively position individual sheets centrally of the exposure frame 74 regardless of size and to always grip or clamp each sheet presented thereto, at the same point thereon as indicated by the line labeled "Clamp line" at the top of Figure 6.

While the invention has been illustrated and described with respect to a preferred embodiment thereof, it is to be expressly understood that various changes and modifications may be made therein without departing from the inventive concept underlying the same. Therefore, the invention is not to be limited except insofar as is necessitated by the prior art and the scope of the appended claims.

What is claimed is:

1. Feed mechanism for document copying apparatus comprising a conveyor system including a drive shaft therefor, document gripping means carried by said conveyor system, means for intermittently driving said conveyor system, a control means for stopping said driving means, means journalled on said shaft adapted for actuating said control means, and means rotatable with said shaft adapted for drivably coupling said actuating means to said shaft in adjusted angular relationship whereby to vary the stopping point of said gripping means relative to said actuating means.

2. Feed mechanism for document copying apparatus comprising a conveyor system including a drive shaft therefor, document gripping means carried by said conveyor system, means for intermittently driving said conveyor system, a control means for stopping said driving means, means journalled on said shaft adapted for actuating said control means, and means rotatable with and adjustable relative to said means for intermittently driving said conveyor system, adapted for drivably coupling said journalled means to said shaft in relative positions of angular adjustment whereby to vary the stopping point of said gripping means relative to said control actuating means.

3. The combination with a document copying apparatus including a fixed exposure frame, of feed mechanism comprising a conveyor system including means adapted for successively gripping and feeding individual sheets to a position centrally of said exposure frame, a motor including a control means therefor to stop said motor, means connecting said motor to said conveyor system, means carried by said connecting means adapted for actuating said control means, and said connecting means including means movable with said conveyor system drivably coupling said connecting means to said conveyor system in selected positions of relative angular adjustment whereby to advance or retard the stopping point of said gripping means relative to said control actuating means.

4. The combination with a document copying apparatus including document positioning means and an exposure frame disposed in spaced alignment thereon, of feed mechanism comprising a conveyor system operable in the path of said positioning means and said frame and including means for gripping a document at said positioning means and for feeding said document to a position centrally of said frame, means adapted for intermittently driving said conveyor system a fixed distance on each actuation, and means for selectively coupling said conveyor system to said driving means in positions of relative angular adjustment whereby to adjust the stopping point of said gripping means relative to said positioning means in accordance with different document sizes.

5. Feed mechanism for document copying apparatus comprising a conveyor system having a fixed surface disposed in the path thereof and including means adapted for successively gripping and feeding individual sheets to a position centrally of said fixed surface, means adapted for intermittently driving said conveyor system a fixed distance on each actuation including a control means for stopping said driving means, means connecting said driving means to said conveyor system including means for actuating said control means, said connecting means further including means for adjusting said gripping means relative to said control actuating means, said adjusting means including means for drivably coupling said connecting means to said conveyor system in different positions of relative angular adjustment whereby to actuate said control means in timed relation to movement of said gripping means.

6. Feed mechanism for document copying apparatus comprising a conveyor system having a fixed surface disposed in the path thereof and including means adapted for successively gripping and feeding individual sheets to a position centrally of said fixed surface, means adapted for intermittently driving said conveyor system a fixed distance on each actuation including a control means for stopping said driving means, means connecting said conveyor system to said driving means for relative movement therebetween including means for actuating said control means, said connecting means further including manually adjustable means for drivably coupling said connecting means to said conveyor system in varying positions of relative angular adjustment to position said gripping means in timed relation to said control actuating means whereby said mechanism is operable to feed individual sheets to different positions on said fixed surface corresponding to different sheet sizes.

7. Feed mechanism for document copying apparatus comprising a conveyor system having a document positioning means and an exposure frame disposed in the path thereof, said conveyor system including means for successively gripping individual documents at said positioning means and for feeding said documents to a position centrally of said frame, a motor, means connecting said motor to said conveyor system, manually operable means for energizing said motor, means for de-energizing said motor, revoluble means movable with said connecting means for actuating said de-energizing means in each revolution thereof, and said connecting means including means for advancing and retarding the stopping point of said gripping means relative to said positioning means and said control actuating means whereby said mechanism is operable to feed individual documents to different positions in said frame corresponding to different sheet sizes.

8. Feed mechanism for document copying apparatus comprising a conveyor system having a document positioning means and an exposure frame disposed in the path thereof, said conveyor system including means adapted for successively gripping individual documents at said positioning means and for feeding said documents to a position centrally of said frame, means for actuating said gripping means upon movement of said conveyor system, a motor, means connecting said motor to said conveyor system, manually operable means for energizing said motor, means for de-energizing said motor, revoluble means movable with said connecting means for actuating said de-energizing means upon completion of one revolution thereof, and said connecting means including means for advancing and retarding the stopping point of said gripping means relative to said positioning means and said control actuating means whereby said mechanism is operable to feed individual documents to different positions in said frame corresponding to different sheet sizes.

9. Feed mechanism for document copying apparatus comprising a conveyor system having a document positioning means and an exposure frame disposed in the path thereof, said conveyor system including means adapted for successively gripping individual documents at said positioning means and for feeding said documents to a position centrally of said frame, means for actuating said gripping means upon movement of said conveyor system, a motor, means connecting said motor to said conveyor system, manually operable means for energizing said motor, means for de-energizing said motor, revoluble means movable with said connecting means for actuating said de-energizing means upon completion of one revolution thereof, said connecting means including means for advancing and retarding the stopping point of said gripping means relative to said positioning means and said control actuating means whereby said mechanism is operable to feed individual documents to different positions in said frame corresponding to different sheet sizes, and means for positively braking said conveyor system upon actuation of said de-energizing means.

10. Feed mechanism for document copying apparatus comprising a conveyor system having a document positioning means and an exposure frame disposed in the path thereof, said conveyor system including means adapted for successively gripping individual documents at said positioning means and for feeding said documents to a position centrally of said frame, means for actuating said gripping means upon movement of said conveyor system, a motor, means connecting said motor to said conveyor system, manually operable means for energizing said motor, means for de-energizing said motor, revoluble means movable with said connecting means for actuating said de-energizing means upon completion of one revolution thereof, said connecting means including means for advancing and retarding the stopping point of said gripping means relative to said positioning means and said control actuating means whereby said mechanism is operable to feed individual documents to different positions in said frame corresponding to different sheet sizes, means for positively braking said conveyor system upon actuation of said de-energizing means, said braking means including cooperating means for stopping said conveyor system in a predetermined position simultaneously with and upon actuation of said de-energizing means.

JOHN HALAHAN
FLOYD A. LYON.
LYNN H. MORTIMER.
THEODORE F. ARONSON.

REFERENCES CITED

The following references are of record in the file of this patent:

UNITED STATES PATENTS

| Number | Name | Date |
|---|---|---|
| 895,659 | Morrison | Aug. 11, 1908 |
| 1,119,857 | Morgan | Dec. 8, 1914 |
| 1,200,597 | Dengler | Oct. 10, 1916 |
| 1,803,935 | Federwitz et al. | May 5, 1931 |
| 1,997,290 | Barber | Apr. 9, 1935 |
| 2,183,045 | Presby | Dec. 12, 1939 |
| 2,371,542 | Place | Mar. 13, 1945 |
| 2,392,032 | Domville et al. | Jan. 1, 1946 |
| 2,496,329 | Briechle et al. | Feb. 7, 1950 |